United States Patent
Girondi

(10) Patent No.: US 10,335,722 B2
(45) Date of Patent: Jul. 2, 2019

(54) FILTER GROUP

(71) Applicant: UFI FILTERS S.P.A., Porto Mantovano (MN) (IT)

(72) Inventor: Giorgio Girondi, Mantova (IT)

(73) Assignee: UFI FILTERS S.P.A., Porto Mantovano (MN) (IT)

( * ) Notice: Subject to any disclaimer, the term of this patent is extended or adjusted under 35 U.S.C. 154(b) by 154 days.

(21) Appl. No.: 15/310,332

(22) PCT Filed: May 12, 2015

(86) PCT No.: PCT/IB2015/000684
§ 371 (c)(1),
(2) Date: Nov. 10, 2016

(87) PCT Pub. No.: WO2015/173624
PCT Pub. Date: Nov. 19, 2015

(65) Prior Publication Data
US 2017/0216745 A1   Aug. 3, 2017

(30) Foreign Application Priority Data

May 15, 2014   (IT) .............................. RE2014A0051

(51) Int. Cl.
*F01M 1/10*     (2006.01)
*B01D 29/21*    (2006.01)
(Continued)

(52) U.S. Cl.
CPC ............. *B01D 35/30* (2013.01); *B01D 29/21* (2013.01); *B01D 29/96* (2013.01); *F01M 1/10* (2013.01);
(Continued)

(58) Field of Classification Search
CPC ........ B01D 35/30; B01D 29/21; B01D 29/96; B01D 2201/4015; B01D 2201/291;
(Continued)

(56) References Cited

U.S. PATENT DOCUMENTS 4,871,455 A  *  10/1989   Terhune ................. B01D 29/15
                                                        210/232
5,154,823 A  *  10/1992   Ma ......................... B01D 35/30
                                                        210/232
(Continued)

FOREIGN PATENT DOCUMENTS

DE      202007017614 U1    4/2009
DE      102010016497 A1    10/2011
EP            2201993 A1 *  6/2010  ............. B01D 29/96

OTHER PUBLICATIONS

English Language Machine Translation of EP 2201993 A1, Generated Dec. 13, 2018, pp. 1-9. (Year: 2010).*

*Primary Examiner* — David C Mellon
(74) *Attorney, Agent, or Firm* — Volpe and Koenig, P.C.

(57) ABSTRACT

A filter cartridge (30) comprising a substantially tubular filter wall (33) and a support plate (32) fixed to an end of the filter wall (33), where the support plate (32) comprises a hooking body (34, 2120) rising from a surface of the support plate (32) opposite the filter wall (30) and defining a profiled surface (3410,3411;2130,2131) substantially perpendicular to the central axis of the filter wall (33) and defining at least two corners (3412,3413;2132,2133) proximal to the central axis, which exhibit different distances from the central axis of the filter wall.

14 Claims, 8 Drawing Sheets

(51) Int. Cl.
  *B01D 29/96* (2006.01)
  *B01D 35/30* (2006.01)
  *F02M 37/22* (2019.01)

(52) U.S. Cl.
  CPC ....... *F02M 37/22* (2013.01); *B01D 2201/291* (2013.01); *B01D 2201/4015* (2013.01); *B01D 2201/4053* (2013.01); *F01M 2001/1035* (2013.01)

(58) Field of Classification Search
  CPC .... B01D 2201/4053; B01D 2201/4061; B01D 2201/4046; B01D 2201/4007; F02M 37/22; F01M 1/10; F01M 2001/1035
  See application file for complete search history.

(56) References Cited

U.S. PATENT DOCUMENTS

| | | | |
|---|---|---|---|
| 7,871,515 B2 * | 1/2011 | Brandt | B01D 29/21 210/232 |
| 2005/0000886 A1 | 1/2005 | Reynolds et al. | |
| 2009/0301950 A1 | 12/2009 | Weindorf | |
| 2010/0219116 A1 * | 9/2010 | Milum | B01D 29/21 210/236 |

* cited by examiner

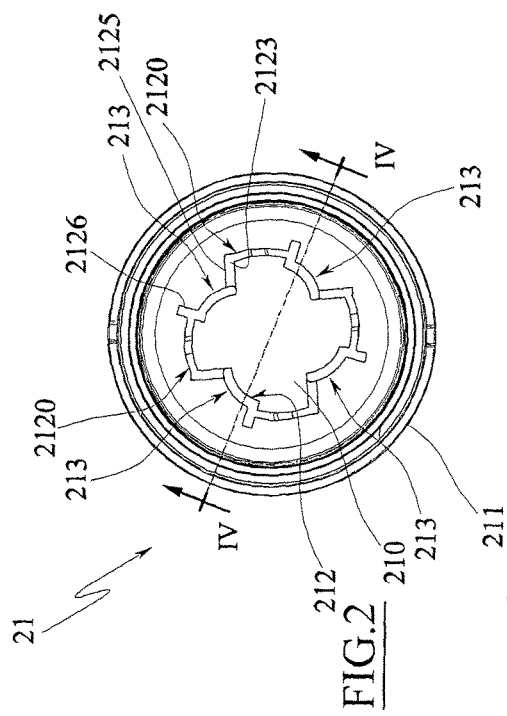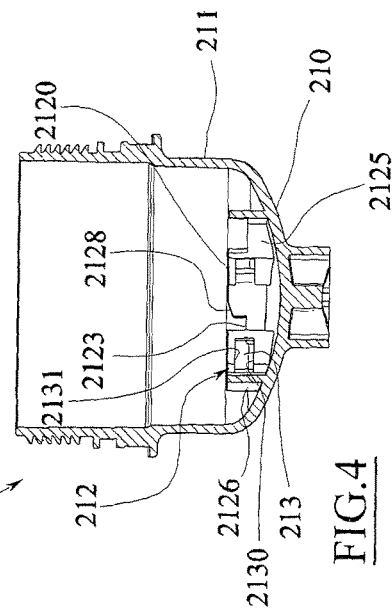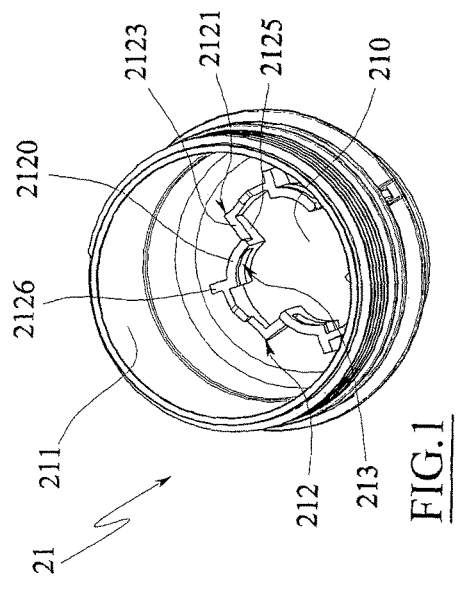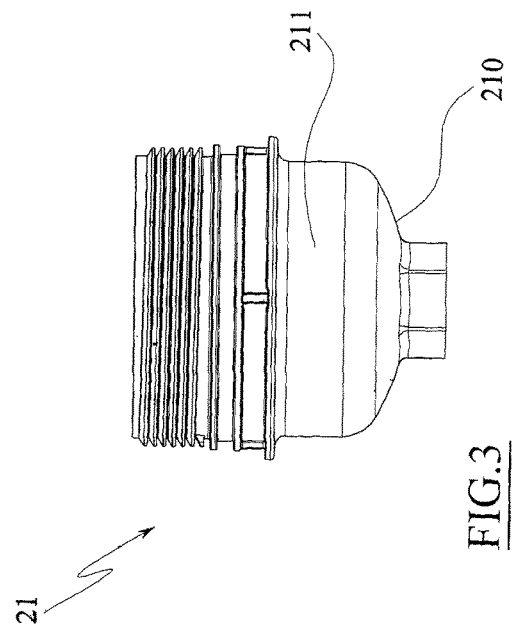

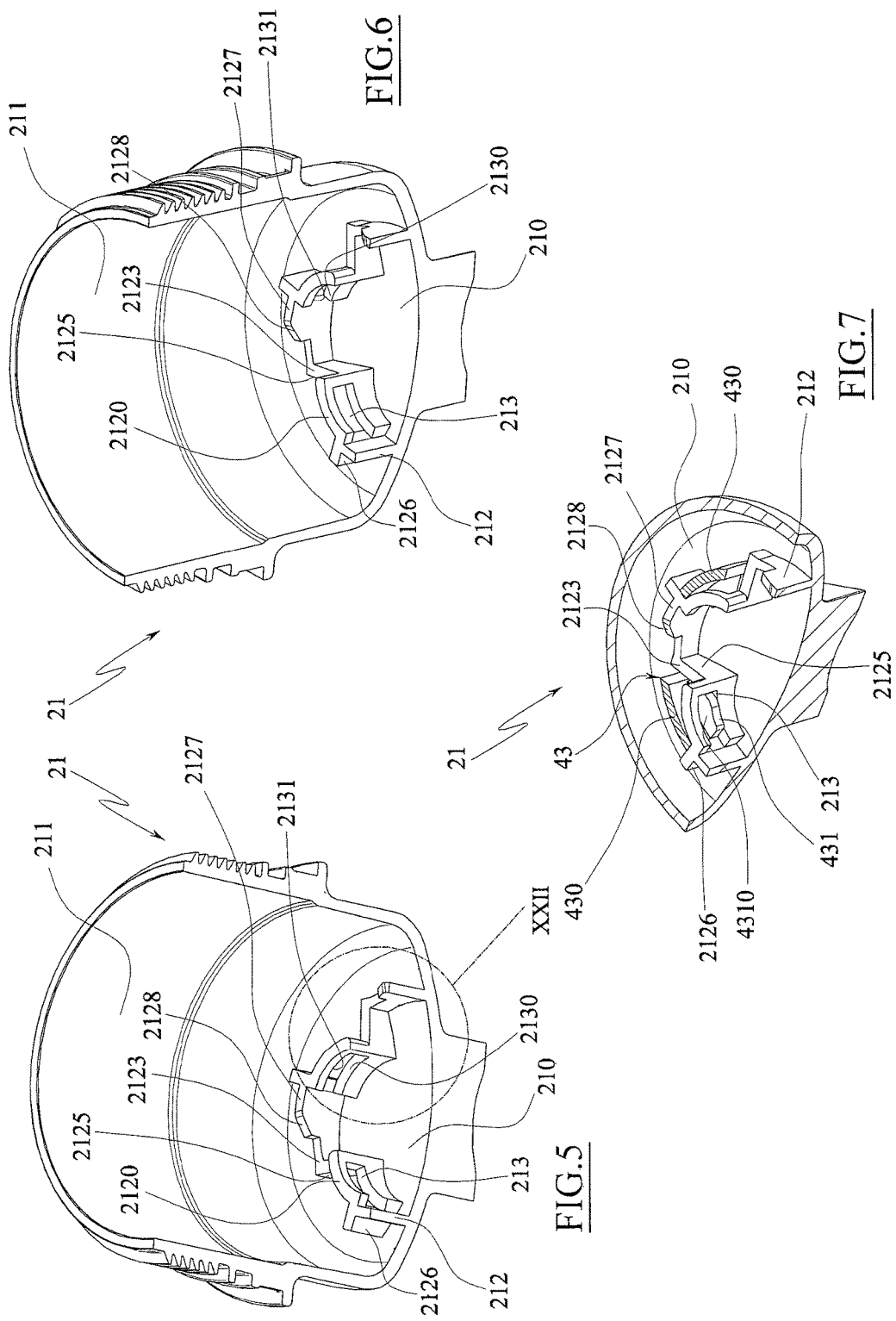

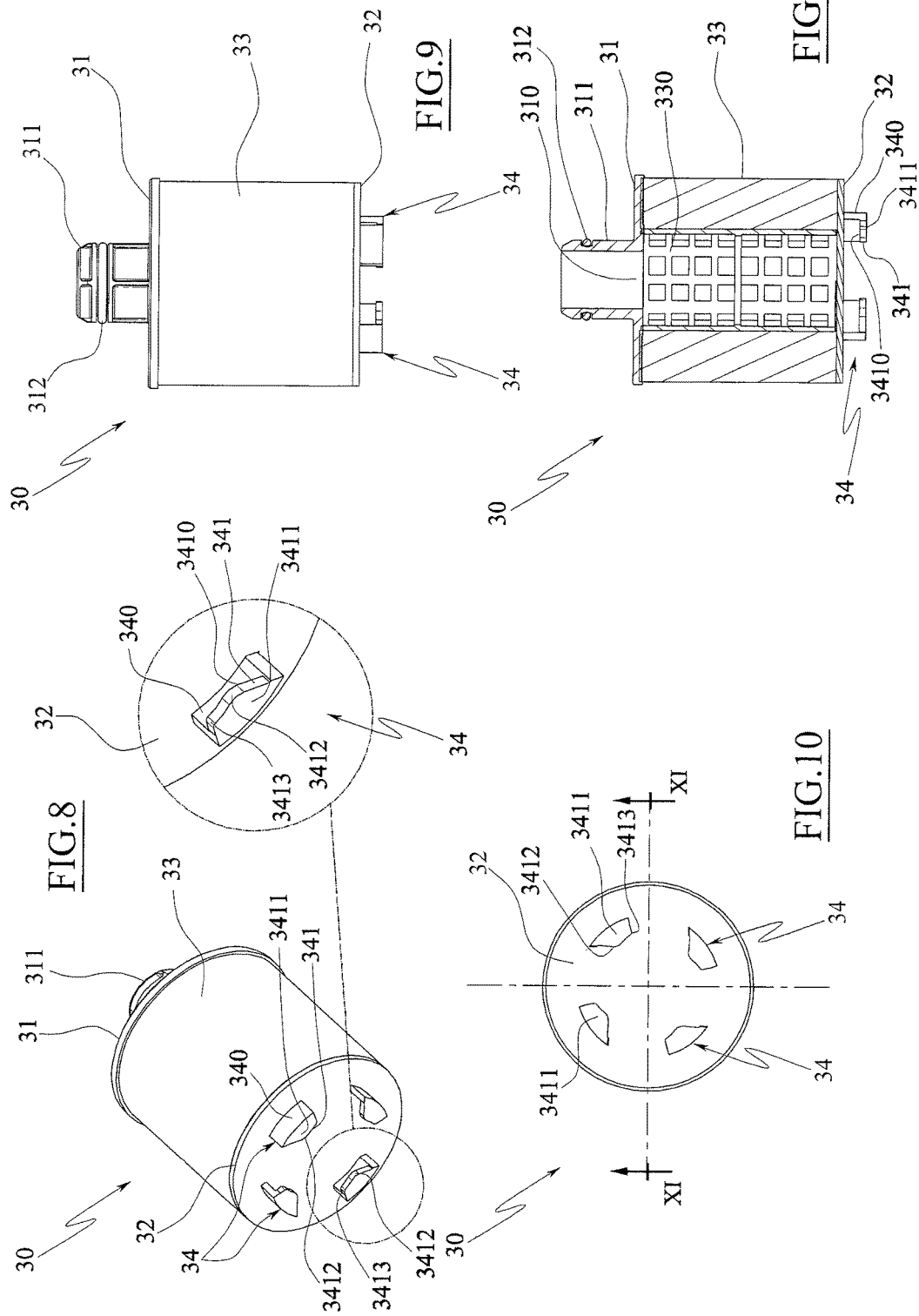

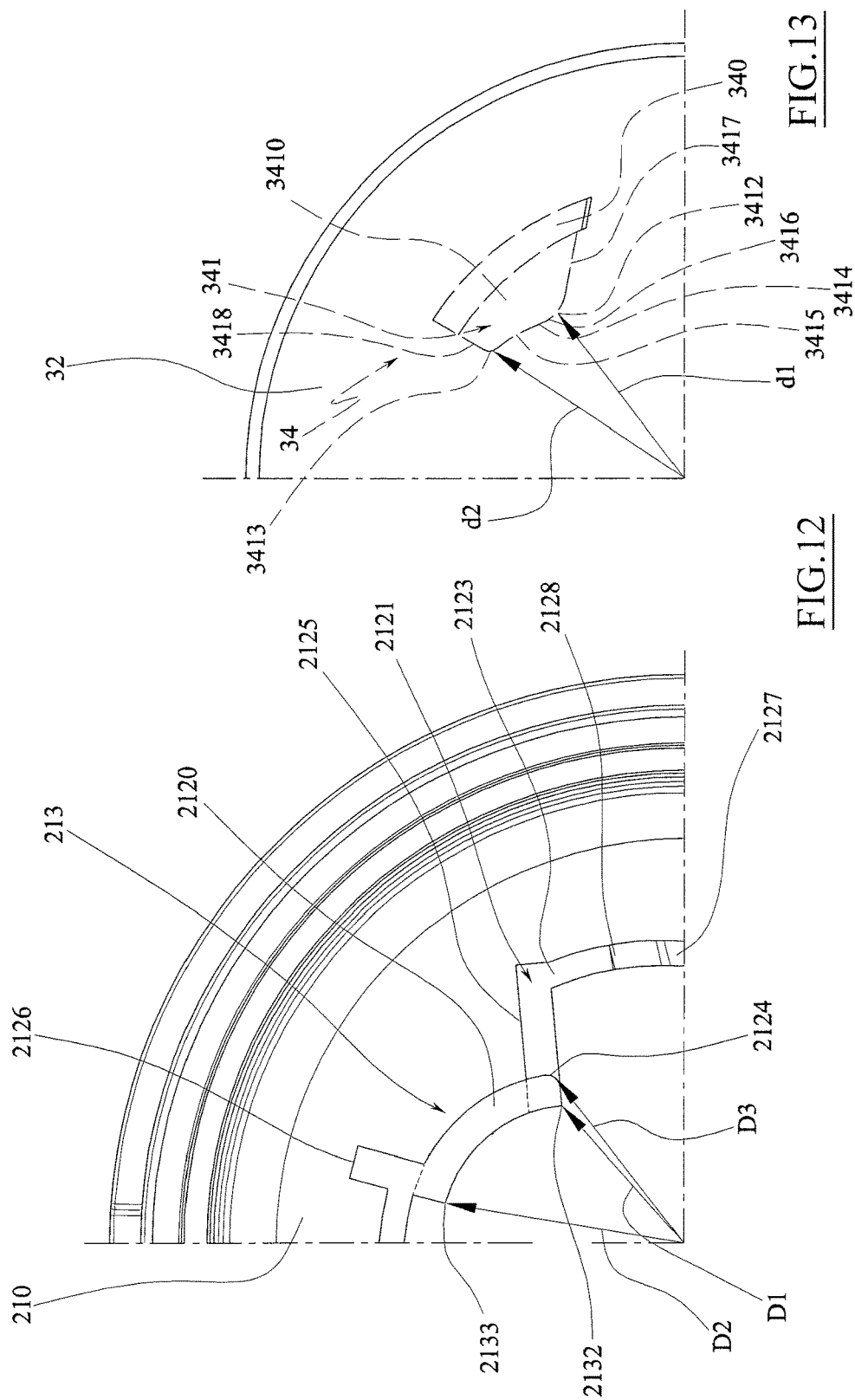

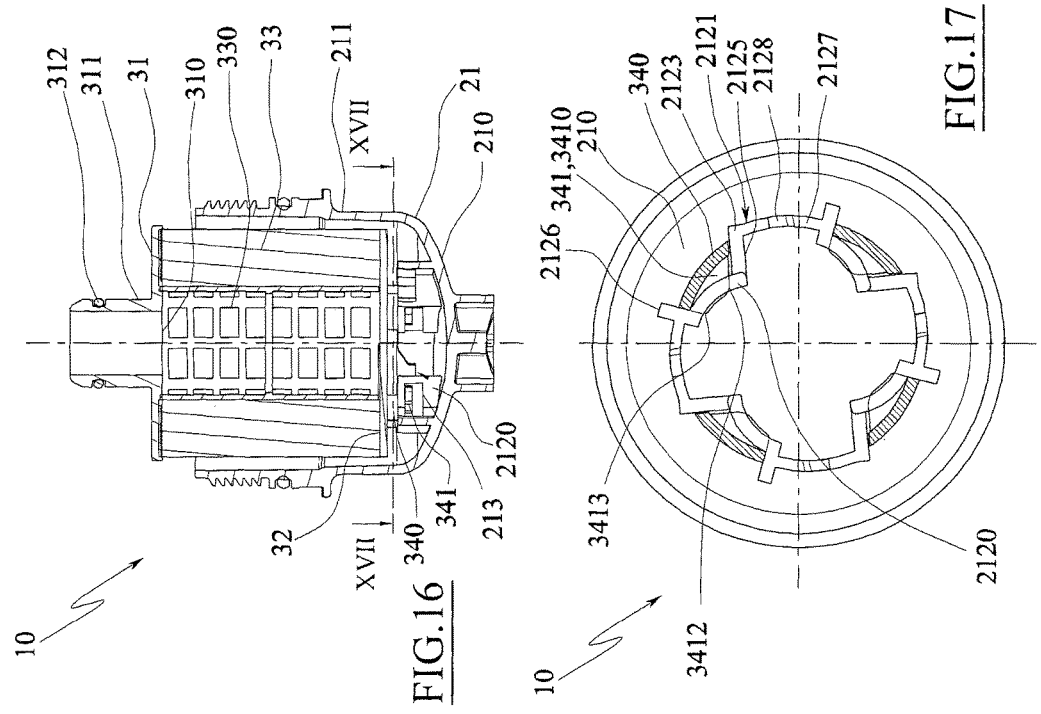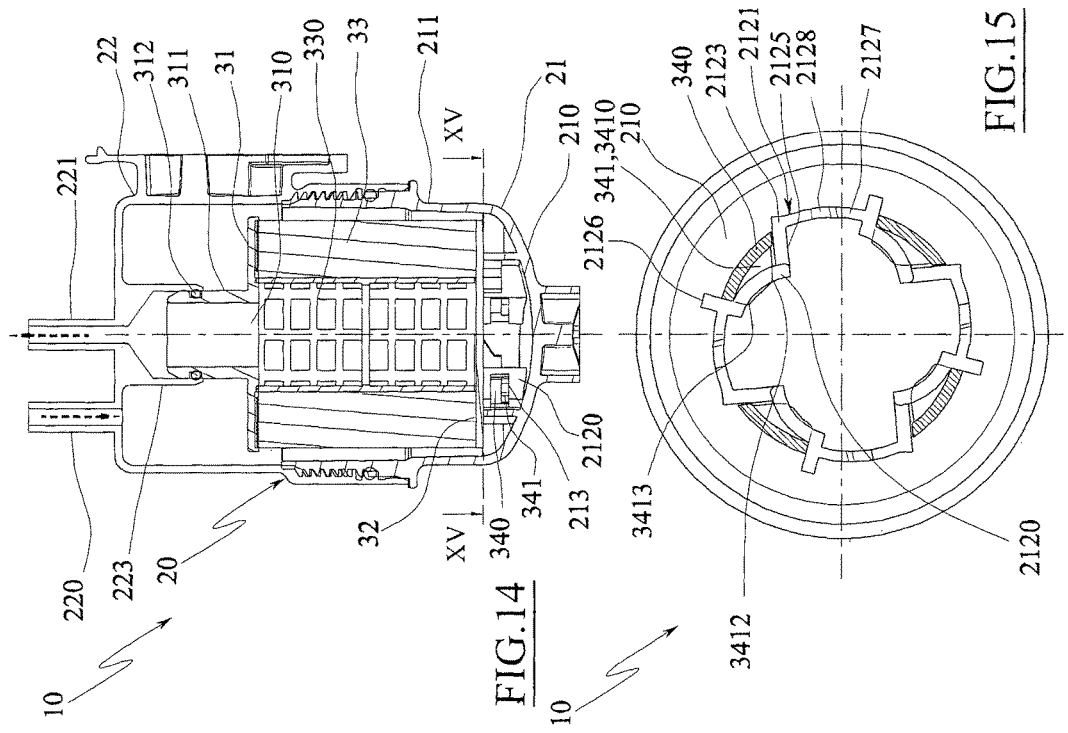

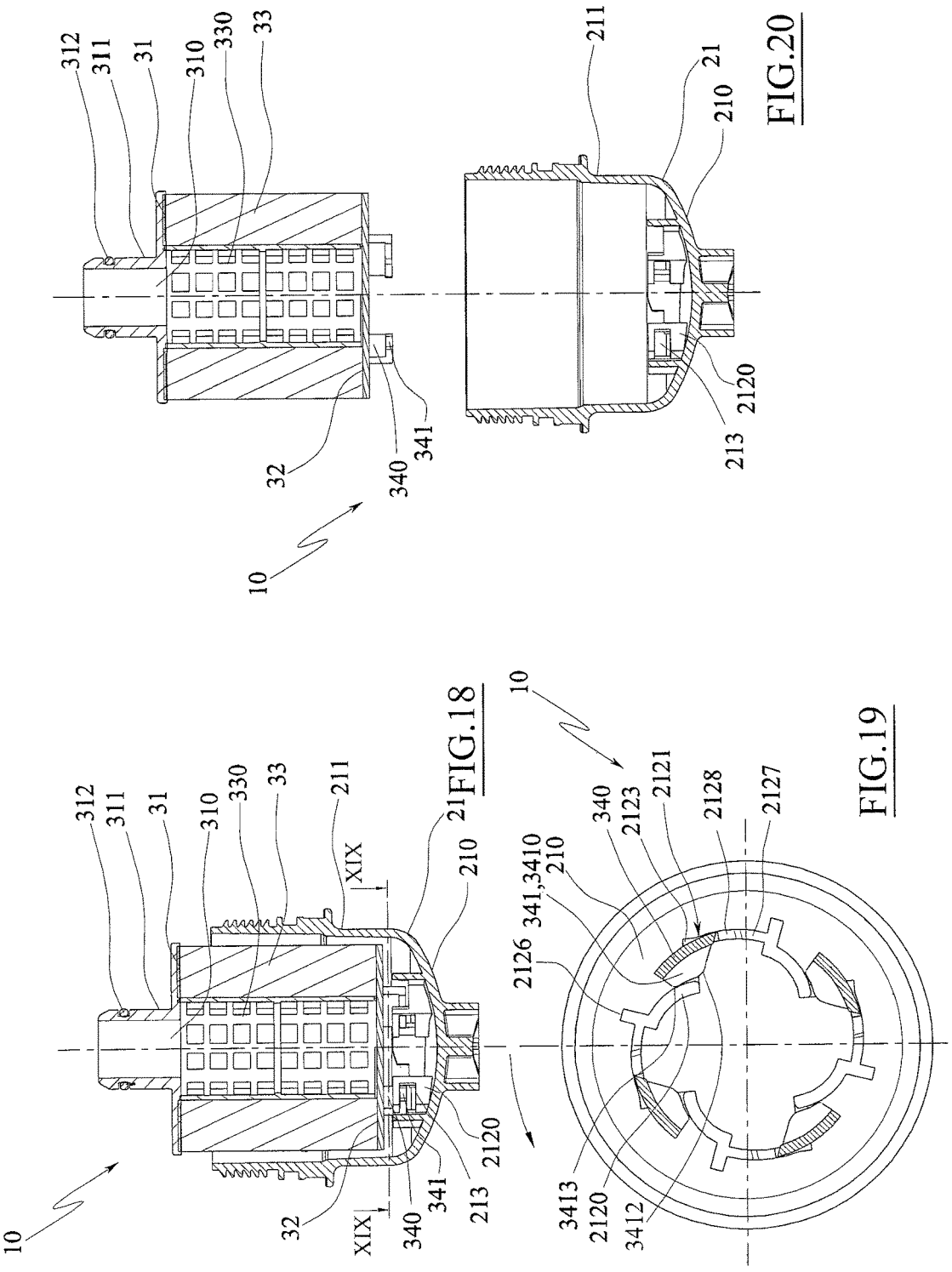

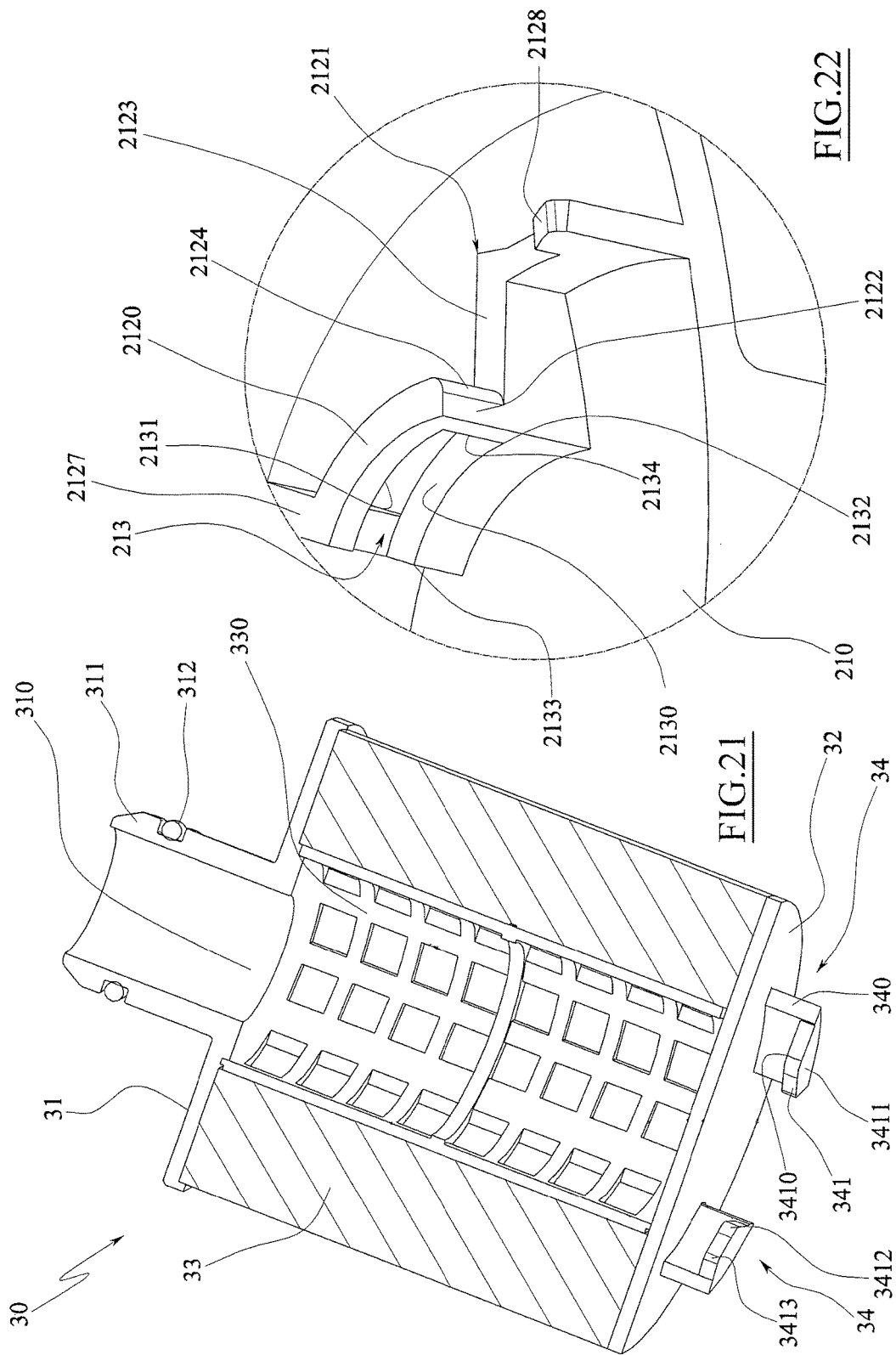

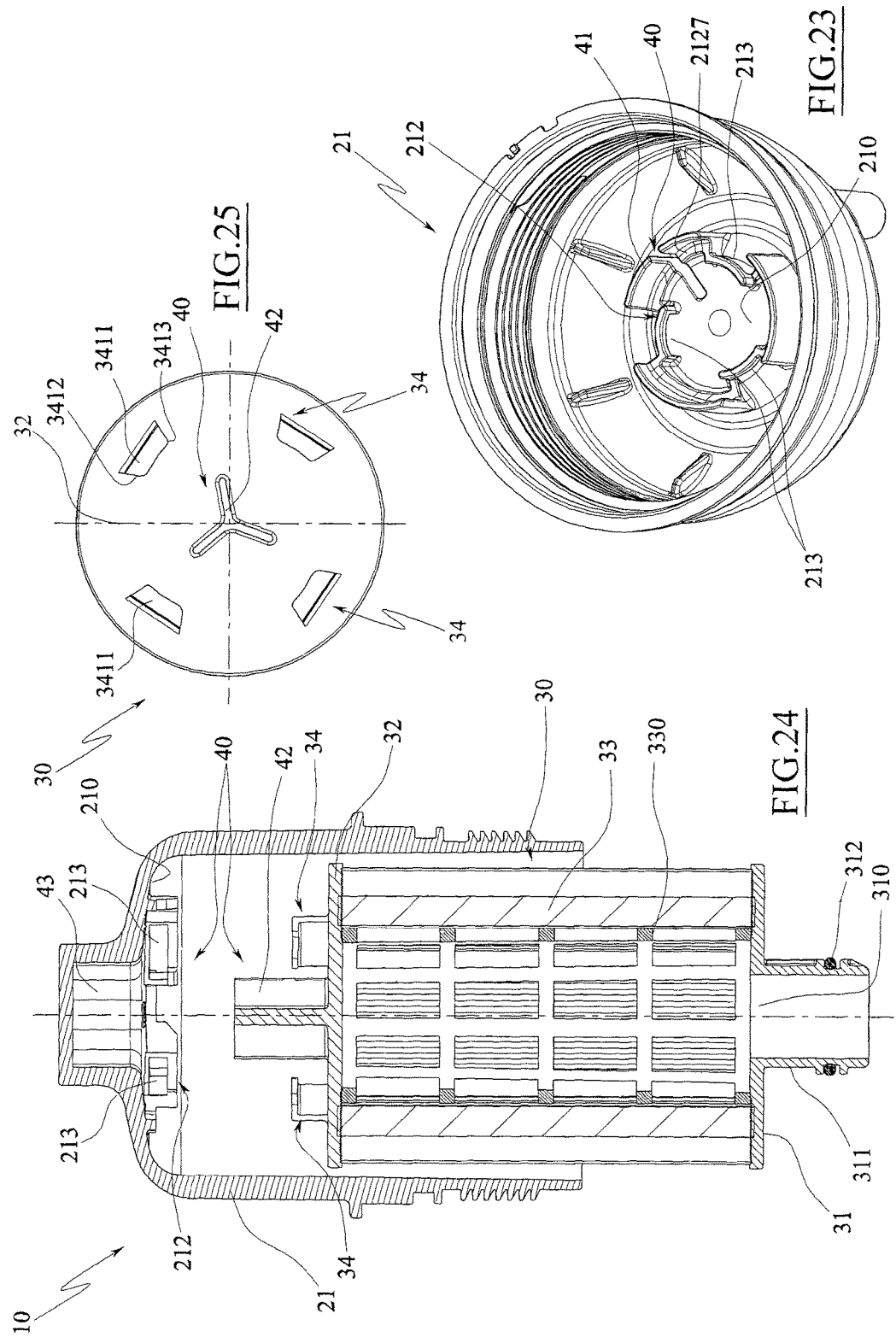

FILTER GROUP

TECHNICAL FIELD

The present invention relates to a filter group and a support body destined to support a filter cartridge internally of a filter group.

The invention mainly relates to a filter group for fuel, oil or comburent air in the motoring field, for example in the field of automobiles or heavy duty vehicles or the like.

PRIOR ART

As is known, the filtration of diesel in the motoring sector is generally obtained with a group that comprises an external casing provided with an inlet for the fluid to be filtered and an outlet of the filtered fluid, and a filter cartridge able to define a communicating chamber with the inlet of the fluid to be filtered.

In this way, the fluid flowing from the inlet towards the outlet of the filter group is forced to cross through the filter wall that retains the impurities possibly present in it.

A typical filter cartridge comprises a filter wall having a tubular shape and two support plates, upper and lower, which are fixed to opposite ends of the filter wall.

At least one of these support plates is commonly provided with a central opening, aligned with the longitudinal axis of the filter wall, through which the internal volume of the filter wall is set in communication with the inlet of the fluid to be filtered, in a case where the filter wall is configured to be crossed from inside towards outside, or with the outlet of the fluid to be filtered, in a case where the filter wall is configured to be crossed from outside towards inside.

The casing, in these types of filters, usually comprises or is associated to a support body able to support the filter cartridge.

In some applications, the installation and replacement of the filter cartridge can represent a problem, linked to the steps of movement and manoeuvring thereof.

To attempt to alleviate the task of the personnel installing the filter cartridge, the prior art provides various solutions for removably hooking the filter cartridge to the casing (for example a lid of a beaker body or a support body). A first type of these solutions includes the use of a bayonet engagement: these types of hook-up comprise at least two profiled protrusions defined in the filter cartridge, each of which can be inserted in a special groove realized in the support flange, so that the hook-up is carried out by a modest axial translation of the filter cartridge towards the support flange and by a consequent modest rotation with respect to the axis of the filter cartridge.

These bayonet engagements, however, exhibit some drawbacks due mainly to the necessary complexity of the hook-up and also to the fact that the reverse unhooking of the profiled protrusions is not prevented.

For this reason it is in fact generally necessary to include means blocking the reciprocal rotation between the filter cartridge and the support flange (or casing), which are for example flexible-type devices, grooves with labyrinthine profiles or threaded organs.

These blocking systems are on the one hand not very reliable and not resistant over time, especially after repeated replacements of the filter cartridge, while on the other hand they lead to an increase in production costs of the filter cartridge and the casing (support body), as well as the costs due to the increase in times required, during maintenance operations, for replacing the filter cartridge.

A second known type of hooks, alternative to the above-described bayonet engagements, includes the use of axial-fit hooks, which, however, especially in types of applications where the filter cartridge exhibits a large weight and size in comparison to the support body (casing) which is destined to contain it, makes the exact positioning of the hooking means awkward, as during the hooking operations to the support body the filter cartridge hides the snap-fit hooks from view.

Further, the need to ensure the engaging of a filter cartridge of this type, rather heavy, would necessarily lead to the realizing of an axial snap-fit that is particularly robust and therefore difficult to remove.

To obviate these drawbacks the use of orientating means of the cartridge with respect to the support body is known, which orientating means in practice direct the hooking teeth to align axially with the hooking seating, so that once aligned they can be axially pressed for the reciprocal hooking between the hooking teeth and the hooking seating.

However, as it is necessary for the hooking tooth to exhibit a high resistance to axial flexion, so that the reciprocal hooking between the filter cartridge and the hooking tooth is stable, the thrust necessary for pushing the hooking tooth in the hooking seating must, at times, be high, which is not easy for the personnel assembling the filter group.

A third type of hook of known type is substantially a hybrid of the two above-described solutions, in which the snap-fit hooking teeth snap-fit into hooking seatings located on a support body, and exhibit a ramp on a lateral flank which, for example together with a corresponding ramp which extends over the whole lateral flank of the hooking seating, facilitates the unhooking of the filter cartridge from the support body, by performing a reciprocal rotation thereof with respect to the axis of the filter cartridge.

Further, use of shaped shanks is known, able to operate as cams for the filter cartridge, so as to guide the hooking teeth towards the hooking seating during the rotation of the filter cartridge internally of the support body.

In any case the hooking teeth and the respective hooking seatings are defined on cylindrical portions such as to enable reciprocal rotation of the hooking teeth with respect to the hooking seating.

A first drawback encountered in these known-type hooks is the fact that as they are realised on cylindrical portions, for example having substantially standard dimensions, a filter cartridge unsuitable for a filter group can be by mistake inserted and hooked to the support body of the filter group, which for example would not function as required or would exhibit problems connected to the breakage of the hooks.

A further drawback encountered in these known-type hooks, whether of the bayonet type or the hybrid type (bayonet and snap-fit) lies in the fact that the angle of rotation required to complete the hooking between the hooking teeth and the respective seating is particularly large, in practice twice the angular arc of the hooking tooth (or the hooking seating), which in order to guarantee a good stable hook-up, with a small number of hooking teeth (for example from 2 to 4), cannot be too limited.

An aim of the present invention is to obviate the above-mentioned drawbacks in the prior art with a solution that is simple, rational and relatively inexpensive.

These aims are attained by the characteristics of the invention reported in the independent claim. The dependent claims delineate preferred and/or particularly advantageous aspects of the invention.

DESCRIPTION OF THE INVENTION

The invention relates in particular to a filter cartridge comprising a substantially tubular filter wall and a support plate fixed to an end of the filter wall, wherein the support plate comprises a hooking body rising from a surface of the support plate opposite the filter wall and defining a profiled surface substantially perpendicular to the central axis of the filter wall and defining at least two corners proximal to the central axis, which exhibit different distances from the central axis of the filter wall.

This solution enables reducing the rotation angle required for the hooking, where a rotation is included of the filter cartridge and, further, it is possible to guarantee a certain mechanical coherence of the hooking connection thereof in the respective support body, extending also to the axial-type hook-ups.

For the same above-illustrated aims, in an aspect of the invention the profiled surface exhibits a longitudinal median axis substantially arched and centred on an axis of curvature parallel and offset with respect to the central axis of the filter wall.

In a further aspect of the invention, the hooking body comprises two opposite lateral flanks delimiting, in a circumferential direction, the profiled surface, wherein the lateral flanks lie on converging planes on a converging axis parallel and offset with respect to the central axis of the filter wall.

With this solution, the lateral flanks define gentle dragging surfaces able to improve the hook-up and release of the hooking body.

In a further aspect of the invention, the hooking body comprises a profiled front side proximal to the central axis and radially delimiting the profiled surface, able to conjoin the corners.

The profiled side advantageously exhibits a first concave portion, proximal to the corner more distant from the central axis, with a concavity facing towards the central axis and a convex portion, proximal to the corner more proximal to the central axis, with a convexity facing towards the central axis.

In practice, the profiled side defines a cam profile for the hooking body.

The profiled surface advantageously exhibits a substantially irregular trapezoid shape, in which the smaller base is proximal to the central axis of the filter wall.

In a still further advantageous aspect of the invention, the hooking body comprises a hooking tooth provided with a stalk, rising from the support plate and elastically flexible in a radial direction, and a hooking head extending from the stalk in a radial direction, the profiled surface being defined by the surface of the hooking head projecting from the stalk.

The invention further discloses a support body able to support filter cartridges which comprises a disc-shaped wall comprising a hooking body rising from a surface of the disc-shaped wall and defining a profiled surface substantially perpendicular to the central axis of the disc-shaped wall and defining at least two corners proximal to the central axis, which exhibit different distances from the central axis of the disc-shaped wall.

This solution enables reducing the rotation angle required for the hooking, where a rotation is included of the filter cartridge and, further, it is possible to guarantee a certain mechanical coherence of the hooking connection thereof in the respective support body, extending also to the axial-type hook-ups.

For the same purposes as illustrated above, the profiled surface exhibits a substantially arched longitudinal axis centred on an axis of curvature parallel and offset with respect to the central axis of the disc-shaped wall.

In an aspect of the invention, the hooking body comprises two opposite lateral flanks substantially perpendicular to the disc-shaped wall and circumferentially delimiting (at least in ideal prolongation) the profiled surface, wherein the lateral flanks lie on converging planes on a converging axis parallel and offset with respect to the central axis of the disc-shaped wall.

The lateral flanks are advantageously defined by respective walls rising from the disc-shaped body and projecting in a transversal direction with respect to the circumferential direction from the hooking element towards an external periphery of the disc-shaped wall.

With this solution it is possible to define two abutting surfaces which delimit and/or block the reciprocal rotation between the filter cartridge and the support body once in the hooked configuration.

These walls also exhibit different heights.

In this way it is possible to define a privileged unhooking direction of the filter cartridge from the support body.

The hooking body advantageously comprises a hooking window realized on an arched wall rising from the disc-shaped wall and inferiorly and/or superiorly delimited by the profiled surface.

The arched wall further exhibits an axis of curvature parallel to and offset with respect to the central axis of the disc-shaped wall.

Thanks to this, the mechanical compatibility between the filter cartridge and the support body is substantially coherent.

The invention further discloses a filter group comprising a support body, as described above, and a filter cartridge as described above, wherein the hooking body of the filter cartridge can be releasably hooked to the hooking body of the support body.

The hook-up head of the hooking tooth is advantageously configured such as to be inserted radially internally of the window with axial play; in this way the hooking tooth, once hooked to the hooking seating defined by the window, is constrained to the support body, though with axial play, in an axial direction.

The stalk of the hooking tooth is further able to be axially inserted, substantially snugly, between the walls rising from the surface of the disc-shaped wall when the hooking head is inserted in the window; in this way the hooking tooth, once hooked to the hooking seating defined by the window, is constrained to the support body in a circumferential direction.

The invention further relates to a filter group, protectable also independently with respect to what is described above, which comprises a substantially disc-shaped support body and a filter cartridge provided with a filter wall that is substantially tubular, at an end of which a support plate is fixed, which is removably associated coaxially to the support body by hooking means interposed between the support plate and the support body, in which the hooking means comprise at least a pair of offset opposite hooking teeth a hooking portion of which can be received in a pair of opposite hooking seatings realised on a profiled shank, in which each hooking seating is defined by a window realized in an arched wall of a profiled shank.

According to the invention, the profiled shank comprises a lowered zone positioned circumferentially by a side of each window and distanced therefrom by a dividing upright, in which the lowered zone defines a rest surface that is substantially perpendicular to the central axis of at least one from between the support body and the filter cartridge, configured such as to house a hooking tooth and arranged at an intermediate level of the window, a snap-fit being defined between the upright and the hooking portion of the hooking tooth following a reciprocal rotation between the support body and the filter cartridge with respect to the central axis, for transferring the hooking tooth between the lowered zone and the window.

With this solution, the snap-fitting of the filter cartridge to the support body is easy, safe and rapid even when the hooking means are situated in zones of the filter group that are not visible.

Further, thanks to this solution the hooking means, while remaining of the snap-fit type, with the relative structural and functional advantages thereof, are guided in reciprocal movement both in hooking and unhooking, thus attaining the advantages typical of bayonet hook-ups while improving the simplicity and rapidity of engaging and disengaging.

In a still further aspect of this invention, the profiled shank comprises a first wall projecting transversally with respect to the circumferential direction from the base of the dividing upright, in which the first wall exhibits a height that is substantially equal to the height of the rest surface.

In this way, the hooking teeth are blocked in rotation, once inserted in the respective hooking seatings, preventing the accidental unhooking thereof.

Again, with the same aims, the profiled shank comprises a second wall projecting transversally with respect to the circumferential direction from the arched wall of the profiled shank and arranged on the opposite side of the first wall with respect to the window, in which the second wall exhibits a greater than or identical height to the maximum height of the window.

In practice, each hooking tooth is contained in the circumferential direction between the first wall and the second wall when engaged in the respective hooking seating, the different height of the walls enabling imparting a preferential access direction to the window and exit therefrom of the hooking tooth.

The profiled shank advantageously comprises a substantially circumferential raised portion interposed between the window of a hooking seating and the lowered zone of the hooking seating contiguous in a circumferential direction, the raised portion exhibiting a height that is substantially equal to the height of the arched wall of the profiled shank.

With this solution, the circumferential alignment of the hooking tooth to the respective window can occur only when the hooking tooth occupies the lowered zone of the profiled shank; in practice, the profiled shank defines an obligatory pathway for enabling the hooking and unhooking of each hooking tooth in and from the respective hooking seating.

In an advantageous aspect of the invention, an inclined ramp is defined between the raised portion and the rest surface of the lowered zone.

In a further aspect of the invention, the arched wall exhibits a concavity facing towards the central axis of curvature and offset with respect to the central axis.

With this solution, the angle of rotation required for hooking and unhooking the hooking teeth to the respective hooking seatings is greatly limited.

Further, with the present solution the hooking seating is made accessible, i.e. mechanically compatible, to a small number of variants of the hooking teeth, thus ensuring that conforming original parts are used when maintaining the filter group.

The raised tract and the arched wall advantageously exhibit different distances from the central axis.

Also, the rest surface of the lowered zone exhibits a plan development that is substantially L-shaped, a first portion of which, transversal with respect to the circumferential direction, is defined on the upper edge of the first wall and a second portion of which substantially prolongs the raised portion in a circumferential direction.

With this solution, the engaging tooth is substantially snugly housed internally of the lowered zone partially surrounded by the profiled shank in both circumferential and radial directions.

In an aspect of the invention each hooking tooth comprises a stalk, for example flexible in a radial direction, and a hooking head extending substantially projectingly from the stalk (at the free end thereof) and provided with at least a distal end from the stalk located at a first distance from the central axis that is smaller than the distance between the central axis and the distal portion from the central axis of the dividing upright.

With this solution, the mechanical compatibility between the hooking seating and the hooking tooth is optimised.

The hooking head advantageously exhibits a profiled shape defining at least two corners proximal to the central axis, which exhibit different distances from the central axis.

The hooking head preferably exhibits an axial section substantially conformed as an irregular trapezium, in which the smaller base is proximal to the central axis.

In this way the contact between the profiled shank and the hooking tooth during the reciprocal hooking rotation is gradual and progressive so as to facilitate the elastic flexion of the stalk and therefore the reciprocal snap-fitting.

The stalk advantageously exhibits a transversal section having an elongate and arched shape, with a concavity facing towards the central axis.

With this solution, the stalk exhibits a resistance to flexion that is greater, given an equivalent thickness.

Again, at least a portion of the stalk of the hooking tooth exhibits a distance from the central axis that is substantially equal to the distance from the central axis of a portion of the raised portion, the arched wall and the second wall of the profiled shank; a portion of the head exhibits an at least equal distance to the distance of the arched wall of the shaped flank.

In a still further aspect of the invention, the filter group comprises centring means, cooperating between the filter cartridge and the support body configured so as to axially centre the central axis of the filter wall of the filter cartridge with the central axis of the disc-shaped wall of the support body.

With this solution, it is easily to near the hooking teeth to the respective windows, including in conditions of poor visibility and poor availability of manoeuvring space, thus facilitating the hooking operations of the filter cartridge to the support body thereof.

BRIEF DESCRIPTION OF THE DRAWINGS

Further characteristics and advantages of the invention will emerge from a reading of the description that follows, provided by way of non-limiting example, with the aid of the figures of the accompanying tables.

FIG. 1 is an axonometric view of a support body according to the invention.

FIG. 2 is a view from above of FIG. 1.

FIG. 3 is a lateral view of FIG. 1.

FIG. 4 is a section view along section line IV-IV of FIG. 2.

FIG. 5 is a first axonometric view of FIG. 4.

FIG. 6 is a second axonometric view of FIG. 4.

FIG. 7 is a third axonometric view of FIG. 4 with the hooking teeth inserted in the respective hooking seatings.

FIG. 8 is an axonometric view of a filter cartridge according to the invention and a larger-scale view of a detail thereof.

FIG. 9 is a lateral view of FIG. 8.

FIG. 10 is a plan view from below of FIG. 9.

FIG. 11 is a section view along section line XI-XI of FIG. 10.

FIG. 12 is a larger-scale view of a detail of FIG. 2.

FIG. 13 is a larger-scale view of a detail of FIG. 10.

FIG. 14 is a section view of a filter group according to the invention in assembled configuration.

FIG. 15 is a section view along section line XV-XV of FIG. 14.

FIG. 16 is a view of the filter group of FIG. 14 in a first demounted configuration.

FIG. 17 is a section view along section line XVII-XVII of FIG. 16.

FIG. 18 is a view of the filter group of FIG. 14 in a second demounted configuration.

FIG. 19 is a section view along section line XIX-XIX of FIG. 18.

FIG. 20 is a view of a filter group of FIG. 14 in a demounted configuration.

FIG. 21 is an axonometric view of FIG. 11.

FIG. 22 is a larger-scale view of detail XXII of FIG. 5.

FIG. 23 is an axonometric view of a support body according to the invention.

FIG. 24 is a section view of a further embodiment of a filter group in an intermediate configuration between a demounted configuration and a mounted configuration.

FIG. 25 is a plan view of a support plate provided with hooking teeth of the filter group of FIG. 24.

BEST WAY OF CARRYING OUT THE INVENTION

With particular reference to the figures (in particular FIGS. 14-20), the reference numeral 10 denotes in its entirety a filter group, for example for fuel (e.g. Diesel oil), oil, air or another fluid in the motoring field.

The filter group 10 comprises an external casing, denoted in its entirety by 20, able to contain and define a support body for at least a filter cartridge 30.

The beaker-shaped body 20 comprises in turn a beaker body 21 and a cover 22 suitable for closing the beaker-shaped body 21.

The cover 22 (upper only in the FIG. 14) is conformed, in the example, substantially as a lid and exhibits a thread (internal) screwable into a corresponding thread (external) defined on the open edge of the beaker-shaped body 21.

The cover 22 affords at least an inlet conduit 220 of the fluid to be filtered and an outlet conduit 221 of the filtered fluid, in the example realised at the top wall of the cover 22, with the outlet conduit 221 preferably in a central position.

The outlet conduit 221 is located coaxially to the cover 22 and projects at least partly internally thereof by means of a first cylindrical seating 223.

The beaker body 21, which in the illustrated example defines the support body supporting the filter cartridge 30, comprises a bottom wall 210 that is substantially disc-shaped and a lateral wall 211 that is substantially cylindrical.

A hooking body emerges from the bottom wall 210 defined in the example by a profiled shank 212 (see in particular FIGS. 1-7, 14-20 and 22) having at least two opposite hooking seatings 213, for example diametrically opposite one another.

In the example the profiled shank 212 comprises four hooking seatings 213 diametrically opposite two-by-two and, for example, equidistant.

Each hooking seating 213 is realized at a respective arched wall 2120 of the profiled shank 212.

The arched wall 2120 in the illustrated example exhibits an elongate transversal section (perpendicular to the central axis of the beaker body 21), for example with a substantially curved longitudinal axis.

In the example, the longitudinal axis of the arched wall 2120 which lies on a plane that is perpendicular to the central axis of the beaker body 21 is substantially arched with a concavity thereof facing towards the central axis of the beaker body 21.

In particular, the longitudinal axis of the arched axis 2120 is centred on an axis of curvature parallel and offset with respect to the central axis of the bottom wall 210.

The hooking seating is defined by a window 213, for example passing from side to side in a transversal direction (i.e. substantially radial), realized in each arched wall 2120 of the profiled shank 212.

The window 213, for example, exhibits a substantially rectangular shape (see the detail of FIG. 22) and is inferiorly delimited by a lower flat profiled surface 2130, for example perpendicular to the central axis of the beaker body 21, superiorly by a upper flat profiled surface 2131, for example also perpendicular to the central axis of the beaker body 21, and advantageously superposed in plan view to the lower flat surface 2130.

The lower flat profiled surface 2130, like for example the upper flat profiled surface 2131, exhibits a profiled shape, for example polygonal, defining at least two corners 2132, 2133 proximal to the central axis of the beaker body 21, which exhibit different distances from the central axis of the beaker body.

A first corner 2132 exhibits, therefore, a distance D1 (see FIG. 12) from the central axis of the beaker body 21 that is smaller than the distance D2 of the second corner 2133 from the central axis.

In the example, the first corner 2132 is the right corner in a plan view (from above) of the arched wall 2120.

For example, the shape of the lower flat profiled surface 2130, like the shape of the upper flat profiled surface 2131, is an arched trapezoid, provided with two arched sides (substantially parallel and with a curvature facing towards the central axis of the beaker body 21).

In practice, the lower flat profiled surface 2130 (like the arched wall 2120 and the upper flat profiled surface 2131) exhibits a longitudinal median axis that is substantially arched and centred on an axis of curvature (the same as the arched wall 2120) that is parallel and offset with respect to the central axis of the bottom wall 210 of the beaker body 21.

Further, the window 213 is closed at a side (containing the first corner 2132, i.e. the radially more internal corner) by a lateral surface 2134 (see FIG. 22) which joins the lower flat profiled surface 2130 and the upper flat profiled surface 2131 (substantially squared thereto) remaining, for example, open on the opposite side.

The profiled shank 212 in particular comprises a lowered zone 2121 located, in a circumferential direction, by a side of each arched wall 2120, i.e. of each window 213 and separated therefrom by a dividing upright 2122.

The lowered zone 2121 of the profiled shank 212 exhibits a height (of the bottom wall 210) that is lower than the height of the arched wall 2120.

The lowered zone 2121 is located on the (closed) side of the window 213 containing the first corner 2132 (radially more internal).

The lowered zone 2121 defines a rest surface 2123 substantially perpendicular to the central axis of the beaker body 21, which is arranged at an intermediate level of the window 213, i.e. intermediate between the level of the lower flat profiled surface 2130 and the level of the upper flat profiled surface 2131.

The dividing wall 2122, which divides the lowered zone 2121 from the window 213 realised in the arched wall 2120, defines, on the side facing towards the window 213, in practice the lateral surface 2134 which delimits the window and on the other side facing towards the lowered zone 212 the rise of a step which conjoins the upper edge of the arched wall 2120 and the rest surface 2123 of the lowered zone 2121.

The dividing upright 2122, for example, exhibits a transversal section (perpendicular to the central axis of the bottom wall 210) that is substantially polygonal, for example rectangular or square.

For example the transversal section of the dividing upright 2122 exhibits at least a beveled vertex 2124 (extending fully) for example at the opposite vertex to the corner defining (aligned in plan view with) the first corner 2132 of the lower flat profiled surface 2130.

The dividing wall 2122, in the example, is realised by an external flank of the arched wall 2120.

The beveled vertex 2124 is distanced from the central axis of the beaker body 21 by a distance D3 (see FIG. 12).

The profiled shank 212 comprises a first wall 2125 projecting in a transversal direction with respect to the circumferential direction from the base of the dividing upright 2122, for example towards the external periphery of the bottom wall 210.

For example, the first wall 2125 exhibits a longitudinal axis (in the transversal direction) that is substantially straight.

Further, the longitudinal axis of the first wall 2125 is inclined with respect to the radial direction.

The first wall 2125 exhibits a height that is substantially equal to the rest surface 2123, in practice defining a portion thereof.

The profiled shank 212 comprises a second wall 2126 projecting, in a transversal direction with respect to the circumferential direction (for example towards the external periphery of the bottom wall 210) from the arched wall 2120 of the profiled shank 212 and arranged on the opposite side of the first wall 2125 with respect to the window 213.

For example, the second wall 2126 exhibits a longitudinal axis (in the transversal direction) that is substantially straight.

Further, the longitudinal axis of the second wall 2126 is inclined with respect to the radial direction (and also to the longitudinal axis of the first wall 2125).

For example, the longitudinal axes of the first wall 2125 and the second wall 2126 converge in a point that is offset with respect to the central axis of the beaker body 21.

The second wall 2126 exhibits a greater than or equal height to the maximum height of the window 213, where by maximum height is meant the level of the upper flat profiled surface 2131 of the window 213.

In the example, the second wall 2126 exhibits a substantially equal height to the height of the arched wall 2120 of the profiled shank 212; in practice the second wall 2126 is a prolongation, with no interruption, of the arched wall, in a substantially perpendicular direction with respect to the development direction of the arched wall.

The profiled shank 212 further comprises a raised portion 2127 having a longitudinal development that is substantially circumferential, which is interposed between the window 213 of a hooking seating and the lowered zone 2121 of the hooking seating that is contiguous in a circumferential direction.

For example, the raised portion 2127 branches from the second wall 2126 substantially in a circumferential direction, for example in an intermediate portion thereof, in an opposite direction with respect to the window 213 (i.e. with respect to the first wall 2125).

In practice, the raised portion 2127 exhibits a substantially identical height to the height of the arched wall 2120 (and therefore also of the second wall 2126) of the profiled shank 212.

The raised portion 2127 and the arched wall 2120 exhibit different distances from the central axis of the beaker body 21, in practice the raised portion 2127 is at a distance (mean) from the central axis of the beaker body 21 that is greater than the distance (mean) from the central axis of the arched wall 2120.

The profiled shank 212 comprises an inclined ramp 2128 interposed between the raised portion 2127 and the rest surface 2123 of the lowered zone 2121.

The inclined ramp 2128 comprises a first portion proximal to the raised portion 2127 with a slight gradient and a second portion, contiguous to the first portion and proximal to the rest surface 2123, with a shaper gradient, for example parallel to the central axis of the beaker body 21.

In the example, the rest surface 2123 of the lowered zone 2121 exhibits a plan development that is substantially L-shaped, a first portion whereof proximal to the arched wall 2120 exhibits a longitudinal development that is transversal with respect to the circumferential development and is defined by the upper edge of the first wall 2125 and a second portion whereof substantially prolongs, in a circumferential direction, the raised portion 2127.

The inclined ramp 2128, which is interposed between the second portion of the rest surface 2123 and the raised portion 2127, is substantially aligned in a circumferential direction therewith.

The profiled shank 212, in practice, exhibits a closed profile in a circumferential direction provided with a raised upper edge, realised at each arched wall 2120, each raised portion 2127 and each second wall 2126, and a lowered upper edge located at a lower level than the raised upper edge, which is realised at each rest surface 2123 of the lowered zone 2121 (each connected by the respective inclined ramp 2128 to the raised upper surface).

The filter group 10 comprises, as mentioned above, a filter cartridge 30, shown in detail in FIGS. 8-11, 31 and 21, which can be received internally of the casing 20, for example coaxially thereto, and hooked, as will be more fully described in the following, to the support body defined in the example by the beaker body, more in particular by the bottom wall 210 of the beaker body 21.

The filter cartridge 30 comprises an upper support plate 31 and a lower support plate 32, which are fixed to the opposite ends of a filter wall 33 of tubular shape, in the illustrated example a pleated wall, which defines and delimits a substantially cylindrical internal volume.

The filter cartridge 30 can further comprise one or more support cores 330 inserted internally of the filter wall 33 and provided with through-openings for the passage of the fluid being filtered.

The upper support plate 31 exhibits a central hole 310 centred on the central longitudinal axis of the filter wall 33.

In particular, the upper support plate 310 exhibits a substantially cylindrical central shank 311 delimiting and prolonging the central hole 310 axially.

The central shank 311 is able to support a first annular gasket 312.

In use, the central shank 311 with the respective first annular gasket 312 can be inserted substantially snugly internally of the first cylindrical seating 223 of the casing 20, i.e. of the cover 22.

The lower support plate 32 is for example disc-shaped.

A hooking body emerges from the surface of the lower support plate 32 opposite the surface fixed to the filter wall 33, which hooking body, in the present example, is a pair of opposite offset hooking teeth 34, for example diametrically opposite.

In the example the lower support plate 32 comprises four hooking teeth 34, opposite two-by-two and, for example, reciprocally equidistant.

Each hooking tooth 34 comprises a stalk 340, for example flexible in a substantially radial direction, a lower end of which branches from the lower support plate 32 and an upper end of which is free.

The stalk 340 exhibits, in the illustrated example, an elongate transversal section (perpendicular to the central axis of the filter cartridge 30), for example with a substantially curved longitudinal axis.

In the example, the longitudinal axis of the stalk 340, which lies on a perpendicular plane to the central axis of the filter cartridge 30, is substantially arched with a concavity facing towards the central axis of the filter cartridge.

In particular, the longitudinal axis of the stalk 340 is centred on an axis of curvature coinciding with or very close (parallel and offset with a reduced offset amount) to the central axis of the filter cartridge 30.

At least a portion of the stalk 340 of the hooking tooth 34 exhibits a distance from the central axis of the filter cartridge 30 substantially equal to the distance from the central axis of the beaker body 21 of at least a length of raised portion 2127, the second wall 2126 and the arched wall 2120 of the profiled shank 212 (i.e. the portions of the profiled shank 212 exhibiting a greater height).

In this way, when the filter cartridge 30 is coaxially neared to the bottom wall 210 of the beaker body 21, the free end of the hooking tooth 34 (i.e. the stalk 340) can come into contact with one or more of the portions having a greater height than the profiled shank 212, i.e. with one or more from among the free ends of the raised tract 2127, the second wall 2126 and the arched wall 2120.

The stalk 340 exhibits a width, in a circumferential direction, that is substantially equal (slightly smaller) than a distance (for example the minimum distance) circumferentially between the first wall 2125 and the second wall 2126.

In practice, the stalk 340 can be inserted axially, with a small circumferential play, between the first wall 2125 and the second wall 2126 during the reciprocal hooking-up between the filter cartridge 30 and the beaker body 21, as will be more fully described in the following.

A hooking head 341 branches from the free upper end of the stalk 340, extending substantially projectingly from the stalk 340 in a substantially parallel direction to the lower support plate 32.

For example the hooking head 341 projects in a radial direction from the stalk 340 towards the central axis of the filter cartridge 30.

A portion of the hooking head 341 advantageously exhibits a distance from the central axis of the filter cartridge 30 that is at least equal to the distance of the arched wall 2120 of the profiled shank 212, in particular the lower flat profiled surface 2130 (and/or the upper flat profiled surface 2131) of the window 213.

In this way, at least a portion of the hooking head 341 can enter into the window 213, substantially superposing axially on the lower flat profiled surface 2130 (and/or to the upper flat profiled surface 2131) for the axial retaining of the hooking tooth 34 in the hooking seating.

In the example, the hooking head 341 comprises a first profiled surface 3410 flat and facing towards the lower support plate 32 and substantially parallel thereto (perpendicular to the central axis of the filter cartridge 30) and a second profiled surface 3411, for example also substantially flat and for example parallel to the first profiled surface 3410 (or inclined according to requirements).

The second profiled surface 3411 is distanced from the lower support plate 32 by a distance that is at least equal to or greater than the distance between the upper edge (free) of the arched wall 212 and the lower flat profiled surface 2130 of the window 213.

The hooking head 341 (see FIG. 13) is provided with at least a corner 3412 distal from the stalk 340 (able to conjoin, in an axial direction, the first profiled surface 3410 and the second profiled surface 3411), which is located at a distance d1 from the central axis of the filter cartridge 30 which is smaller than the distance D3 between the central axis of the beaker body 21 and the beveled vertex 2124 of the dividing upright 2122.

In the illustrated example the hooking head 341 exhibits a profiled shape, for example conformed substantially as an irregular trapezium in which the smaller base thereof is proximal to the central axis of the filter cartridge 30, which profiled shape defines at least two corners 3412, 3413 (conjoining, in axial direction, the first profiled surface 3410 and the second profiled surface 3411), for example rounded, proximal to the central axis of the filter cartridge 30.

The corners 3412, 3413 exhibit different distances from the central axis, in particular a first corner 3412, i.e. the left corner in a plan view (from below) of the lower support plate 32, exhibits a distance from the central axis of the filter cartridge 30 that is smaller than the distance d2 of the second corner 3413.

The first corner 3412 is the corner of the hooking head 341 located at distance d1 from the central axis of the filter cartridge that is smaller than the distance D3 between the central axis of the beaker body 21 and the beveled vertex 2124 of the dividing upright 2122, while the second corner 3413 is, for example, located at distance d2 from the central axis of the filter cartridge that is greater than or equal to the distance D3 between the central axis of the beaker body 21 and the beveled vertex 2124 of the dividing upright 2122. Between the first corner 3412 and the second corner 3413, for example, the hooking head 341 comprises a profiled side 3414 (see FIG. 13), for example provided with a concave portion 3415, proximal to the second corner 3413, with a concavity facing towards the central axis of the filter cartridge 30, which is substantially complementary to the beveled profile of the beveled vertex 2124 of the dividing wall 2122.

Further, the profiled side 3414 comprises a convex portion 3416, proximal to the first corner 3412, with a convexity facing towards the central axis of the filter cartridge 30, which for example is contiguous to the concave portion.

The lateral flanks 3417, 3418, opposite in a circumferential direction, of the hooking head 341 exhibit inclined profiles, for example radial or, as illustrated, inclined with respect to the radial direction, for example exhibiting different inclinations.

For example, a first lateral flank 3417 of the hooking head 341, the free end of which is defined by the first corner 3412, exhibits a greater inclination (and a greater length), with respect to the radial direction, of the second lateral flank 3418, the free end of which is defined with the second corner 3413.

The lateral flanks 3417, 3418 of the hooking head 341 are, in practice, lying on converging planes in an axis of convergence that is substantially parallel and offset with respect to the central axis of the filter cartridge 30 and for example displaced towards the second corner 3413.

The hooking head 341 is conformed such as to be housed, substantially snugly, in the lowered zone 2121 of the profiled shank 212, for example with the second profiled surface 3411 of the hooking head 341 resting on the rest surface 2123 thereof.

In practice, when the hooking tooth 34 is axially aligned with the lowered zone 2121 of the profiled shank 212, the second profiled surface 3411 of the hooking head 341 rests on the rest surface 2123 of the lowered zone.

At the same time the beveled vertex 2124 rests against the concave portion 3415 of the profiled side 3414 of the hooking head 341 (or in any case defines a circumferential abutment for the hooking teeth 34) and the second portion of the inclined ramp 2128 rests against a flank of the hooking tooth 34 i.e. the hooking head 341 and/or the stalk 340 proximal to the first corner 3412 (or in any case defines a circumferential abutment for the hooking tooth 34).

In this position, for example the first corner 3412 is arranged internally of the lowered zone 2121, while the hooking tooth 34 (i.e. the stalk 340 and the hooking head 341) is partially radially aligned to the window 213 (for example with an advanced portion thereof comprising the second corner 3413) and the lowered seating 2121 (for example with a retracted portion thereof comprising the first corner 3412).

In a possible embodiment of the filter group 10, centring means 40 can be comprised between the filter cartridge 30 (as described above) and the casing (20 as described above), for example the beaker body 21, which centring means 40 are configured so as to axially align the central longitudinal axis of the filter cartridge 30 with the central axis of the casing 20 or the beaker body 21.

The centring means 40 are such as to facilitate the hooking operations of the hooking teeth 34 in the windows 213, as will be more fully described in the following.

The centring means 40, in a first embodiment shown in FIG. 23, comprise a delimiting wall 41, for example substantially cylindrical or cylindrical in portions, which is coaxially fixed to the bottom wall 210 of the beaker body 21.

The delimiting wall 41 exhibits an internal diameter which is greater than the distance from the central axis of the beaker body 21 of the profiled shank 212.

The delimiting wall 41 exhibits a height from the bottom wall 210 that is greater than the height of the profiled shank 212.

For example the delimiting wall 41 is formed by a plurality of portions separate from one another and aligned with respect to an imaginary circumference, each of which can be aligned radially with a raised portion 2127 of the profiled shank 212. The delimiting wall 41 might also be a continuous cylindrical shank.

In practice, when the filter cartridge 30 is inserted in the beaker body 21 with the hooking teeth 34 facing towards the bottom wall 210 thereof, the hooking teeth themselves, i.e. the most external circumferential surface thereof substantially snugly enters the delimiting wall 41, which in practice places the filter cartridge 40 coaxial with the beaker body 21, so as to invite the hooking teeth 34 to hook with the windows 213 as will be described in detail in the following.

In a second embodiment shown in FIGS. 24 and 25, the centring means 40 can comprise a centring element 42 which rises axially from the lower support plate 32, i.e. from the surface of the lower support plate 32 opposite the surface fixed to the filter wall 33 (from the same surface the hooking teeth 34 rise from).

In the example, the centring element 42 is coaxial with the lower support plate 32.

The centring element 42 can exhibit a greater height that that of the hooking teeth 34.

Further, the centring element 42 in the example exhibits a substantially star-shaped plan section, though it could however be of any shape (polyhedral or even a body of revolution).

In this embodiment the centring means 40 further comprise a centring seating 43, which is defined, for example coaxially, at the bottom wall 210 of the beaker body 21 and can house, with a small amount of radial play, the centring element 42. The coupling between the centring element 42 and the relative centring seating 43 guarantees the positioning of the filter cartridge 30 in a coaxial position with respect to the beaker body 21.

Further, the connection between the centring seating 43 is such as to enable a reciprocal rotation (total or at least partial even for a limited arc of rotation) between the centring element and the centring seating, and thus of the filter cartridge 30 with respect to the beaker body 21, when the centring element 43 is axially inserted internally of the centring seating 43.

The centring seating 42 exhibits a substantially cylindrical cavity that is polygonal or star-shaped (in the latter case, with a width of the arms that is greater than a width of the central element 42 arms, so as to enable partial rotation of the centring element 42 in the centring seating 43).

The centring element can also project from the upper surface of the support plate by a smaller quantity with respect to the height of the hooking teeth 34. In this case the centring agent is inserted internally of a centring seating delimited by a circumferentially developing wall extending towards the internal cavity of the beaker body and having a height that is sufficient to enable inserting the centring element so as to axially align the central longitudinal axis of the filter cartridge with the central axis of the casing.

It is further possible for the centring element 42 to be defined at the bottom wall 210 of the beaker body (coaxially thereto) and the centring seating 43 to be defined at the lower support plate 32, for example realised by a central hole (through or blind hole).

Further, it is possible (for example in the present embodiment) for the centring element 42 to be defined by a functional element of the filter group 10, for example by a valve body, for example a by-pass valve, inserted snugly in the centring seating 43 (made in the lower support plate 32), for example by interposing a seal ring.

In practice, when the filter cartridge 30 is inserted in the beaker body 21 with the hooking teeth 34 facing towards the bottom wall 210 thereof, the centring element 42 enters the centring seating 43 substantially snugly, the centring seating 43 substantially places the filter cartridge 40 coaxial with the beaker body 21, so as to invite the hooking teeth 34 to hook with the windows 213 as will be described in detail in the following.

In the light of the above-described, the functioning of the filter group 10 is the following.

In order to assemble the filter group 10 it is sufficient, with the casing 20 open, i.e. the cover 22 removed from the beaker body 21, first to axially insert (as described above, for example, with the help of the centring means 40) the filter cartridge 30 internally of the beaker body 21.

In particular, the dimensions of the internal cavity of the beaker body 21 and the external volume of the filter cartridge 30 are such that once the filter cartridge has been inserted in the beaker body 21, the central axis of the filter cartridge 30 is substantially coaxial to the central axis of the beaker body 21.

The filter cartridge 30 is inserted internally of the beaker body 21, with the lower support plate 32 facing towards the bottom wall 210 of the beaker body without a predetermined preferential orientation and up to reciprocal contact.

In particular, the second profiled surface 3411 of the hooking teeth 34 enters into contact with the upper edge of the profiled shank 212, for example with the portion thereof exhibiting the greater height, at the arched wall 2120, of the raised portion 2127 and/or the second wall 2126.

At this point, the profiled shank 212 defines a first axial end-run abutment for the filter cartridge 30.

The centring of the hooking teeth 34 of the filter cartridge 30 with respect to the hooking windows 213 of the profiled shank 212 is obtained by activating the filter cartridge 30 in rotation about the central axis, for example in an anti-clockwise direction, up to when the hooking teeth 34, i.e. the second profiled surface 3411 thereof, drag on the profiled shank 212 and enter the respective lowered zones 2121 of the profiled shank up to stable resting of each second profiled surface 3411 on each rest surface 2123, as described above.

In this position each hooking tooth 34, in particular the hooking head 341 thereof, is flanked (in a circumferential and/or radial direction) to the hooking seating defined by the window 213.

Continuing the rotation of the filter cartridge 30, for example by a limited angle (of 15-25°, for example 21°), the hooking head 341 enters the window 213 and snap-fits thereto.

In practice, during the hooking rotation the reciprocal dragging between the profiled side 3414 of the hooking head 341 (from the concave portion 3415, along the convex portion 3416, up to the first corner 3412) and the beveled vertex 2124 of the dividing wall 2122 produces the flexing of the hooking teeth 34, i.e. the stalk 340, radially in an outward direction.

In practice, the convex portion 3417 of the profiled side 3414 of the hooking head 341 defines a cam profile for the hooking tooth 34 configured such as to push the stalk 340 in radial flexion in forced contact between the hooking head 31 with the dividing wall 2122 during a reciprocal axial hooking rotation. When, following the hooking rotation, the first corner 3412 has passed beyond the beveled vertex 2124 and the hooking tooth 34 is substantially radially aligned with the window 213, the hooking tooth is free to return elastically into the rest position so as to engage the hooking head 341 with the window.

In particular, in this hooking configuration with the hooking tooth 34 in the rest position, the hooking head 341 is substantially aligned axially with the lower flat profiled surface 2130 and the upper flat profiled surface 2131.

Further, the hooking tooth 34 is free to slide axially along the window 213, for example up to when the second profiled surface 3411 rests on the lower flat profiled plane 2130 of the window (or the first profiled surface 3410 rests on the upper flat profiled surface 2131).

In practice, the filter cartridge 30, for example by its own weight, moves into a neared position to the bottom wall 210, in which the second profiled surface 3411 of the hooking head 341 rests on the lower flat profiled surface 2130 of the window 213.

In this neared position the stalk 340 of each hooking tooth 34 is interposed radially between a respective first wall 2125 and a respective second wall 2126, which prevent (by effect of a substantially frontal reciprocal contact between the flank of the hooking tooth 34 and the respective wall 2125, 2126) any reciprocal rotation between the filter cartridge 30 and the beaker body 21, preventing at the same time the possibility of flexion of the hooking tooth 34.

With the filter cartridge 30 in the hooking position it is possible to close the casing 20 by screwing the relative cover 22 on the beaker body 21.

Following the blocking of the cover 22 on the beaker body 21, any axial (and rotational) movement of the filter cartridge 30 is prevented.

In order to proceed with the removal of the filter cartridge 30 from the casing 20 it is sufficient to operate as follows, in substance in reverse with respect to what is described for the assembly of the filter group 10.

Firstly the cover 22 is unscrewed from the beaker body 21, the eventual adherence between the cover 22 and the filter cartridge 30 are opposed by the circumferential rotation blocking exerted by the second wall 2126 (and/or by the first wall 2125) and any eventual axial blocking exerted by the upper flat profiled surface 2131 of the window 213 on the first profiled surface 3410 of the hooking tooth 34.

Once the cover 22 has been removed, it is sufficient to actuate in axial translation the filter cartridge 30 in the distancing direction from the bottom wall 210 of the beaker body 21, so that the second profiled surface 3411 of the hooking teeth is brought to a higher level than the rest surface 2123 of the lowered zone 2121.

With the filter cartridge 30 raised (detached) from the bottom wall 210, it is sufficient to actuate the filter cartridge 30 in rotation, by a modest angle of rotation (for example 15-20°, preferably 21°), for example in a clockwise direction.

With this detaching rotation the first corner 3412 passes beyond the beveled vertex 2124 and the hooking tooth 34 is free to elastically return into the rest position housed in the lowered zone 2121, for example resting on the rest surface 2123.

In particular, in this detached configuration the filter cartridge 30 is free to slide axially distancingly from the beaker body 21 from which it can be removed and replaced.

The invention as it is conceived is susceptible to numerous modifications and variants, all falling within the scope of the inventive concept.

For example, a hybrid hook-up involving (radial) snap-fitting and bayonet fitting has been described, i.e. which includes a roto-translation of the filter cartridge 30 with respect to the beaker body 21, it is however possible for the reciprocal hook-up to be of the axial snap-fit type, for example in which the hooking head 341 is substantially axially flexible and can enter substantially in an axial direction into the window 213.

Further, it is equivalently possible for the profiled shank 212 to be realised on the support plate 32 of the filter cartridge 30 and the hooking teeth 34 to be located on the disc-shaped wall 210 of the beaker body 21.

It is further possible, equivalently to what is described above, to have the hooking body (i.e. the profiled shank 212 provided with the windows 213 or the hooking teeth 34) realized not on the beaker body 21 but in the cover 22.

Further, all the details can be replaced by other technically-equivalent elements.

In practice, the materials used, as well as the contingent shapes and dimensions, can be any according to requirements, without forsaking the scope of protection of the following claims.

The invention claimed is:

1. A filter cartridge (30) comprising:
    a substantially tubular filter wall (33) having a central axis and
    a support plate (32) fixed to an end of the filter wall (33), wherein the support plate (32) comprises
        a hooking tooth (34) rising from a surface of the support plate (32) opposite the filter wall (30), wherein the hooking tooth (34) comprises:
            a stalk (340), rising from the support plate (32) and elastically flexible in a radial direction, having a lower end branching from the support plate (32) and a free upper end; and
            a hooking head (341) extending from the free upper end of the stalk (340) in a radial direction toward the central axis and defining a profiled surface (3410,3411) substantially perpendicular to the central axis of the filter wall (33) and having at least two radially inner corners (3412, 3413;) proximal to the central axis, which exhibit different distances from the central axis of the filter wall.

2. The filter cartridge (30) of claim 1, wherein the profiled surface (3410,3411;2130,2131) exhibits a longitudinal median axis substantially arched and centered on an axis of curvature parallel and offset with respect to the central axis of the filter wall (33).

3. The filter cartridge (30) of claim 1, wherein the hooking body (34,2120) comprises two opposite lateral flanks delimiting, in a circumferential direction, the profiled surface (3410,3411;2130,2131), wherein the lateral flanks lie on converging planes on a converging axis parallel and offset with respect to the central axis of the filter wall (33).

4. The filter cartridge (30) of claim 1, wherein the hooking body (34) comprises a profiled front side (3414) proximal to the central axis and radially delimiting the profiled surface (3410,3411), able to conjoin the radially inner corners (3412,3413).

5. The filter cartridge (30) of claim 4, wherein the profiled side (3414) exhibits a concave portion (3415), proximal to a radially inner corner (3413) of the two radially inner corners which is more distant from the central axis, wherein the concave portion has a concavity facing towards the central axis and a convex portion (3416), proximal to another radially inner corner (3412) of the two radially inner corners which is more proximal to the central axis, wherein the convex portion has a convexity facing towards the central axis.

6. The filter cartridge (30) of claim 1, wherein the profiled surface (3410,3411;2130,2131) exhibits a substantially irregular trapezoid shape, wherein the smaller base is proximal to the central axis of the filter wall (33).

7. A filter group (10) comprising a support body (21), a disc-shaped wall (210) comprising a hooking body (2120) rising from a surface of the disc-shaped wall (210) and defining a profiled surface (2130,2131) substantially perpendicular to a central axis of the disc-shaped wall (210) and defining at least two radially inner corners (2132,2133) proximal to the central axis, which exhibit different distances from the central axis of the disc-shaped wall, and a filter cartridge (30) according to claim 1, wherein the hooking tooth (34) of the filter cartridge (30) can be releasably hooked to the hooking body (2120) of the support body (21).

8. The filter group (10) of claim 7, wherein the hooking body (2120) of the support body (21) comprises a hooking window (213) realized on an arched wall (2120) rising from the disc-shaped wall (210) and inferiorly and/or superiorly delimited by the profiled surface (2130, 2131), wherein the hooking head (341) of the hooking tooth (34) is configured such as to be inserted radially internally of the hooking window (213) with axial play.

9. The filter group (10) of claim 8, wherein the hooking body (2120) of the support body (21) comprises two opposite lateral flanks perpendicular to the disc-shaped wall (210) and circumferentially delimiting the profiled surface (2130, 2131) of the hooking body (2120), wherein the lateral flanks lie on converging planes on a converging axis parallel and offset with respect to the central axis of the disc-shaped wall (210);
    wherein the lateral flanks are defined by respective walls (2125, 2126) rising from the disc-shaped body (210) and projecting in a transversal direction, with respect to the circumferential direction, from the hooking body (2120) towards an external periphery of the disc-shaped wall (210), and
    wherein the stalk (340) of the hooking tooth (34) is able to be axially inserted, closely, between the walls (2125, 2126) rising from the same surface of the disc-shaped wall (210) from which the hooking body (2120) rises from, when the hooking head (341) is inserted in the hooking window (213).

10. The filter group (10) of claim 7, further comprising a centering device (40), cooperating between the filter cartridge (30) and the support body (21), configured so as to axially center the central axis of the filter wall (33) of the filter cartridge (30) with the central axis of the disc-shaped wall (210) of the support body (21).

11. The filter group (10) of claim 7, wherein the profiled surface (2130,2131) of the hooking body (2120) exhibits a substantially arched longitudinal axis centered on an axis of curvature that is parallel and offset with respect to the central axis of the disc-shaped wall (210).

12. The filter group (10) of claim 9, wherein the walls (2125, 2126) exhibit different axial heights.

13. The filter group (10) of claim 8, wherein the arched wall (2120) exhibits an axis of curvature parallel to and offset with respect to the central axis of the disc-shaped wall (210).

14. The filter group (10) of claim 8, further comprising a lowered zone (2121) located circumferentially by a side of the hooking window (213) and distanced therefrom by a dividing upright (2122), wherein the lowered zone (2121) defines a rest surface (213) perpendicular to the central axis of the disc-shaped wall (210) and is arranged at an intermediate level of the hooking window (213).

\* \* \* \* \*